June 15, 1926.
J. W. WILSON
1,589,033
PLOW AND TRACTOR ATTACHMENT
Filed Oct. 19, 1925
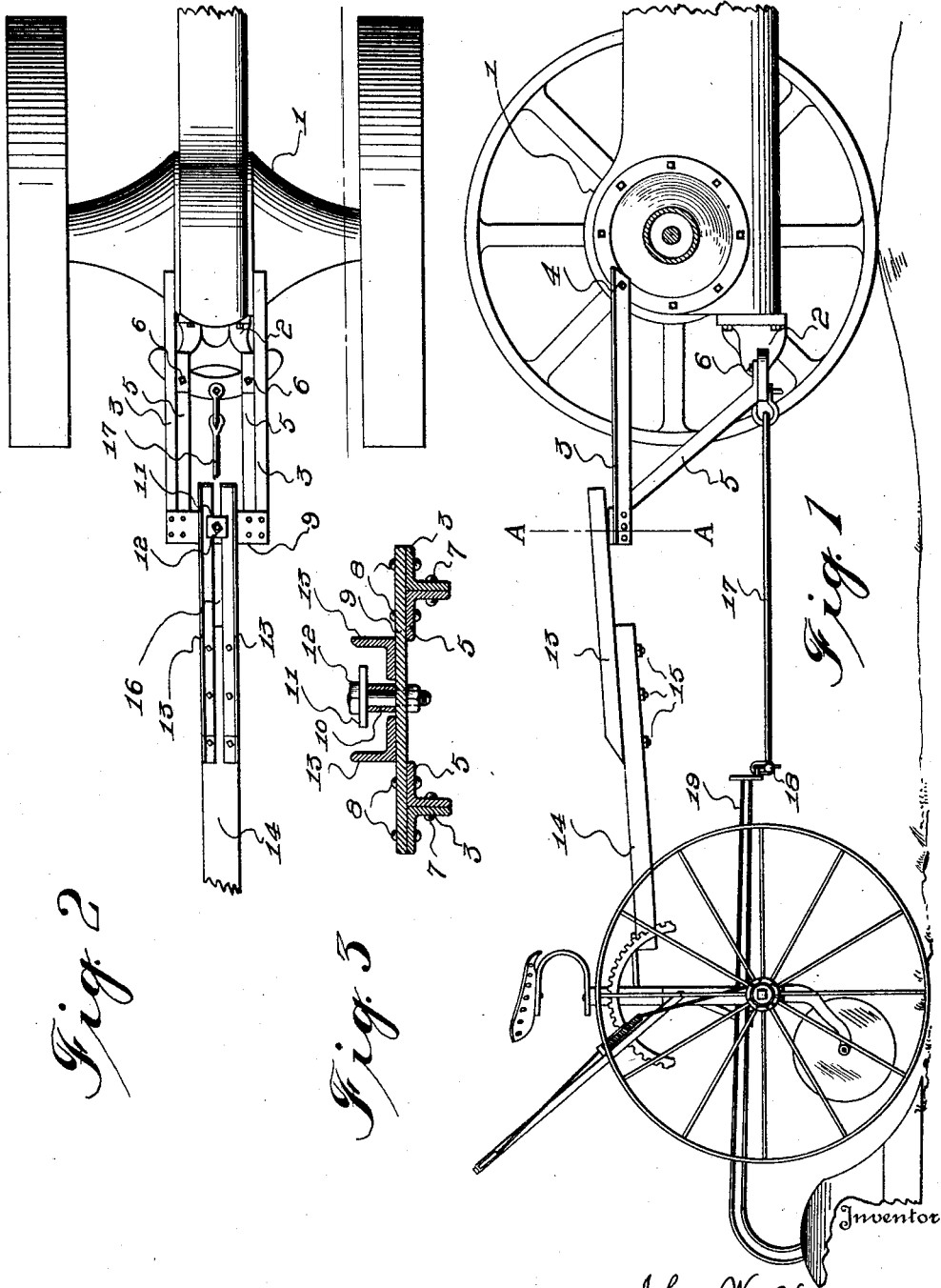

Patented June 15, 1926.

1,589,033

UNITED STATES PATENT OFFICE.

JOHN W. WILSON, OF HALLSBORO, NORTH CAROLINA.

PLOW AND TRACTOR ATTACHMENT.

Application filed October 19, 1925. Serial No. 63,382.

The present invention relates to improvements in attachments for tractors and agricultural implements.

More particularly the invention relates to improvements in attachments for tractors and agricultural instruments whereby ordinary horse drawn implements, such for example as plows may be readily adapted for efficient operation with a tractor. Heretofore it has been the general practice to build implements of the character mentioned which are especially designed for use with tractors. It frequently occurs that ordinary implements are available but cannot be utilized with tractors with the apparatus as at present constructed.

Accordingly an object of the invention is to provide a securing attachment for the ordinary horse drawn type of agricultural implements which will permit the use thereof with a tractor.

A further object of the invention is to provide a securing attachment of the character mentioned which will function to guide the implement, eliminating the necessity for manual guiding thereof.

Another object of the invention is to provide a tractor attachment for agricultural implements in which the implement may be adjusted manually and is then guided by the attachment and in which provision is made for disconnection before injury can occur thereto in case of striking a stump or hang in the ground.

Still further objects of the invention are such as may be attained by a utilization of the various combinations and sub-combinations hereinafter more fully set forth and as defined by the scope of the appended claims.

Referring to the drawings:

Figure 1 is a side elevation with parts broken away of a preferred embodiment of the invention and showing the application thereof to an ordinary hand plow.

Figure 2 is a fragmental plan view of the invention.

Figure 3 is a sectional view taken along line AA of Figure 1.

A tractor 1 of any well known form is provided with a suitable draft attachment 2 which is preferably bolted thereto, or 2 may be the usual draft attachment supplied with any well known form of tractor. A pair of attachment side members 3 preferably of angle iron are secured by means of the bolts 4 at one end thereof to the rear of the tractor housing. A pair of braces 5 preferably of angle iron are secured at their lower ends by means of bolts 6 to the draft attachment 2, or to any other convenient securing point on the tractor, and at their upper ends braces 5 are riveted by means of the rivets 7 to the outer ends of the side members 3. Supported from the outer ends of the members 3 and 5 and secured thereto by means of the rivets 8 is a platform member 9. A guide member 10 preferably tubular in section together with a limiting plate or member 11 is secured to the central portion of the platform 9 by means of a bolt 12.

A pair of tongue supporting and guide members 13 preferably of angle iron, are secured to the ends of a tongue 14 of an ordinary agricultural implement, such for example as a plow, by means of the bolts 15 in such manner that they extend beyond the end of the tongue and form an open ended slot 16 between their inner edges. Members 17 are adapted to rest upon platform 9 with the member 10 in slot 16 and in this position of parts plate 11 will prevent undue upward tilting of the tongue in operation The plow or implement is connected with the tractor by means of draft bar 17 which is secured at one end to the draft attachment 2 of the tractor, and at the other end is secured by means of a pin 18 to the draft attachment 19 of the implement. Pin 18 is preferably of sufficient strength to permit the tractor to pull the plow but will break or shear if an unusual resistance is met by the implement.

In operation of the invention the plow or implement is attached to the tractor as shown in Figures 1 and 2 with the members 13 resting on the platform 9. The plow or implement is adjusted as desired in the usual manner and the tractor is then operated to pull the implement through the draft attachments 17 and 18. If the implement strikes a stump or hang, pin 17 will break or shear, disconnecting the plow before injury can be done and member 10 will be drawn out of the end of slot 16 permitting members 13 and tongue 14 to drop off the platform 9. In this way a complete disconnection of the plow is effected before any damage can be done.

When it is desired to back the plow or implement the tractor may be reversed causing member 10 to slide back in slot 16 until the rear edge of the platform member 9 engages the end of the tongue 14. Further backward movement of the tractor will then cause backing of the implement to any desired distance.

Having described a preferred embodiment of the invention, it will be apparent to those skilled in the art that a highly useful attachment for tractors and agricultural implements has been provided whereby ordinary agricultural implements may be adapted for use with tractors. Accordingly, having described a preferred embodiment only of the invention what is desired to be secured by Letters Patent and claimed as new is:

1. An attachment for securing an agricultural implement to a tractor comprising two spaced members secured to the tongue of the implement providing an open ended slot between them, the end of said tongue serving to close the other end of said slot, and to act as an abutment when the tractor is reversed, a bracket secured to said tractor, said members normally resting on said bracket, a T-shaped member secured to said bracket, the shank of said last named member being arranged between said spaced members and the head thereof being spaced from said spaced members permitting limited tilting and free endwise movement between said tongue and said tractor, and independent means coupling said implement and tractor.

2. An attachment for securing an agricultural implement that includes a tongue to a tractor, comprising a bracket rigidly secured to the tractor, said bracket having an abutment that normally is in position to engage the end of said tongue when the tractor is reversed, means secured to said tongue and resting on said bracket, said means providing an open ended slot, a T-shaped member secured to said bracket with its shank riding freely in said slot and with its head spaced above the slotted member, and independent flexible means coupling said implement and tractor, said last named means embodying an element that will break when the implement encounters an unusual obstruction.

In testimony whereof I hereunto affix my signature.

JOHN W. WILSON.